(12) United States Patent
Zhou et al.

(10) Patent No.: US 9,465,541 B2
(45) Date of Patent: Oct. 11, 2016

(54) APPARATUS AND METHOD FOR CONSTRUCTING STORAGE VIRTUALIZATION NETWORK

(75) Inventors: Di Zhou, Beijing (CN); Fei Xia, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 720 days.

(21) Appl. No.: 13/698,013

(22) PCT Filed: May 12, 2011

(86) PCT No.: PCT/CN2011/073977
§ 371 (c)(1),
(2), (4) Date: Nov. 14, 2012

(87) PCT Pub. No.: WO2011/140989
PCT Pub. Date: Nov. 17, 2011

(65) Prior Publication Data
US 2013/0060902 A1    Mar. 7, 2013

(30) Foreign Application Priority Data

May 14, 2010 (CN) .......................... 2010 1 0178186

(51) Int. Cl.
| | |
|---|---|
| G06F 15/16 | (2006.01) |
| G06F 3/06 | (2006.01) |
| H04L 29/08 | (2006.01) |
| G06F 11/20 | (2006.01) |

(52) U.S. Cl.
CPC ............ *G06F 3/0607* (2013.01); *G06F 3/067* (2013.01); *G06F 3/0662* (2013.01); *H04L 67/1097* (2013.01); *G06F 11/2094* (2013.01)

(58) Field of Classification Search
CPC .. G06F 15/16; G06F 3/0662; G06F 11/2094; H04L 67/1097

USPC ........................................................ 709/217
See application file for complete search history.

(56) References Cited

U.S. PATENT DOCUMENTS

2003/0188114 A1    10/2003    Lubbers et al.
2003/0233510 A1*  12/2003    Umbehocker et al. ....... 711/100
(Continued)

FOREIGN PATENT DOCUMENTS

| CN | 1708742 | 12/2005 |
|---|---|---|
| CN | 1905566 | 1/2007 |

(Continued)

OTHER PUBLICATIONS

Extended European Search Report, 11780210.8, Feb. 10, 2014, 7 pps.
International Search Report and Writen Opinion dated Aug. 18, 2011, PCT Patent Application No. PCT/CN2011/073977 filed May 12, 2011, The State Intellectual Property Office, the P.R. China.

*Primary Examiner* — Vivek Srivastava
*Assistant Examiner* — Normin Abedin
(74) *Attorney, Agent, or Firm* — Hewlett Packard Enterprise Patent Department (57) ABSTRACT

An apparatus and a method for constructing a storage virtualization network are provided according to examples. The apparatus includes a storage module to store first area information. A management module determines whether a first apparatus belongs to the first area based on area information in a message sent by the first apparatus and the first area information. Second storage resources information of the first apparatus is obtained and first storage resources information is updated by utilizing the second storage resources information.

20 Claims, 6 Drawing Sheets

(56) References Cited

U.S. PATENT DOCUMENTS

2006/0259709 A1* 11/2006 Uchiumi ............... G06F 3/0605
　　　　　　　　　　　　　　　　　　　　711/147
2009/0164716 A1　　6/2009　Van Hise et al.

FOREIGN PATENT DOCUMENTS

| CN | 101022400 | 8/2007 |
| EP | 1571543 | 9/2005 |
| EP | 1868075 | 12/2007 |

* cited by examiner

FIG. 3B one or more areas are pre-configured in a storage virtualization network, with each area includes a virtualization device and at least one storage device; each area is allocated with an area identification, and the virtualization device and the storage device within the area stores the area identification of the area; the areas are arranged in a layered structure, where a virtualization device of a lower layer area also serves as a storage device in an upper layer area; /401 a connection is established between a virtualization device and a storage device when the area identification of an area to which the virtualization device belongs is identical with that of an area to which the storage device belongs; /402 the storage device sends information of the storage device to the virtualization device, and the virtualization device performs virtualization processing based on information of the storage device. /403

APPARATUS AND METHOD FOR CONSTRUCTING STORAGE VIRTUALIZATION NETWORK

CLAIM FOR PRIORITY

The present application is a national stage filing under 35 U.S.C 371 of PCT application number PCT/CN2011/073977, having an international filing date of May 12, 2011, which claims priority to Chinese Patent Application No. 201010178186.1, filed on May 14, 2010, the disclosures of which are hereby incorporated by reference in their entireties.

BACKGROUND ART

Storage virtualization is one of key techniques in cloud storage technology. Storage virtualization enables unified management of different storage techniques and different interfaces by a virtualization device, where a user device only needs to initiate a request to the virtualization device without knowing details of each physical storage device. The virtualization device takes full charge in handling requests from user devices, thus management of the storage network is simplified.

Figure 1A:
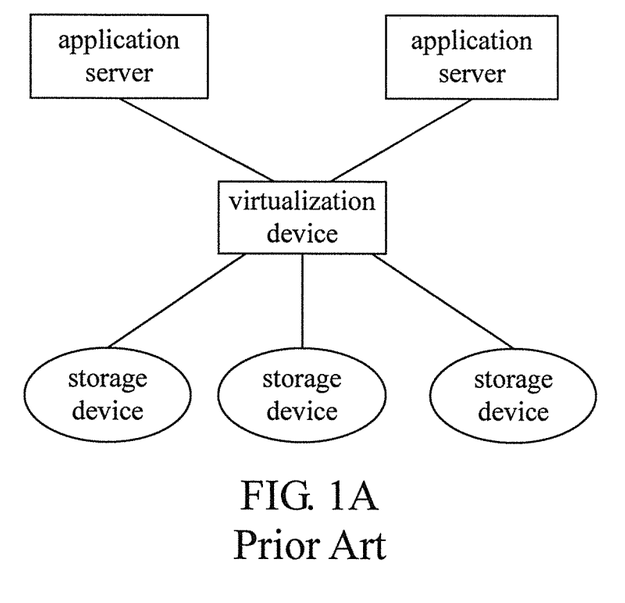
FIG. 1A is a schematic illustrating a network structure of in-band virtualization according to the prior art.
Figure 1B:
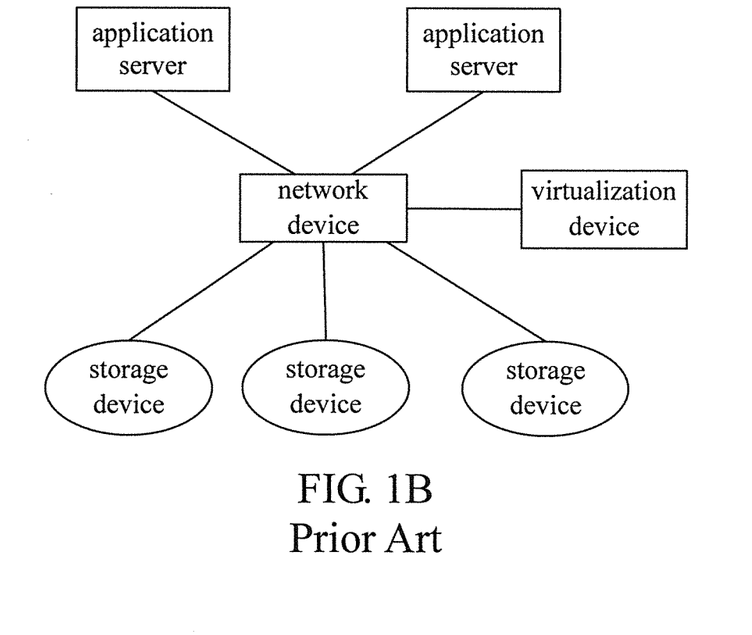
FIG. 1B is a schematic illustrating a network structure of out-band virtualization according to the prior art.

Storage virtualization at present includes two solutions: in-band virtualization and out-band virtualization. FIG. 1A is a schematic illustrating a network structure of in-band virtualization according to the prior art, and FIG. 1B is a schematic illustrating a network structure of out-band virtualization according to the prior art.

According to in-band virtualization, a virtualization device serves as an initiator of storage devices being virtualized, and the storage devices serve as targets of the virtualization device. An application server regards the virtualization device as the target. The virtualization device provides interfaces directly to external devices, and stores received to-be-stored data into the storage devices.

According to out-band virtualization, the virtualization device only provides control functions. Network device also provide part of the control functions. The application server will see a virtualized target. Service flows to be stored will not flow through the virtualization device, but be stored into the storage devices by the network device.

DETAILED DESCRIPTION OF EXAMPLES

At present, each existing storage virtualization solution is exclusively provided by an individual vendor, and virtualization devices and storage devices in each storage virtualization network may be manufactured by different manufacturers. Those devices need to be respectively configured manually and statically based on practical needs, and the configuration workload is very heavy and complicated.

Figure 2:
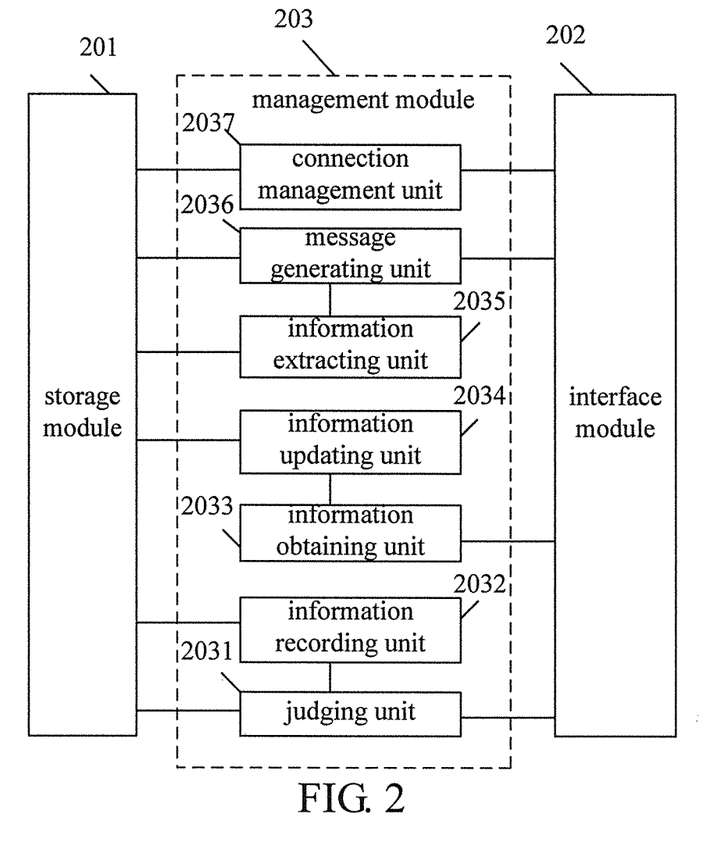
FIG. 2 is a schematic illustrating a structure of an apparatus in a storage virtualization network according to an embodiment.

FIG. 2 is a schematic illustrating a structure of an apparatus in a storage virtualization network according to an embodiment. The apparatus mainly includes:

a storage module 201, configured for store pre-configured first area information, and first storage resources information of the first area;

an interface module 202, configured for interacting with a first apparatus and providing and receiving information from the first apparatus;

a management module 203, configured for judging and determining whether the first apparatus belongs to the first area based on area information in a message sent by the first apparatus and the first area information stored in the storage module 201, obtaining second storage resources information of the first apparatus, and updating the first storage resources information stored in the storage module 201 by utilizing the second storage resources information.

The storage module 201 may further store pre-configured second area information, and the management module 203 may generate a second message based on the first storage resources information in the storage module 201, and send the second message to a second apparatus via the interface module 202 according to the second area information stored in the storage module 201.

In the above example, the apparatus may serve as a virtualization device in the storage virtualization network, and establish connections and exchange information with other devices by utilizing the pre-configured area information. Thus, the apparatuses only need to have respective area information configured according to required network structure, and the apparatuses can automatically establish a storage virtualization network. In this way, there is no longer the need to configure various complex parameters.

The area information, i.e., information of an area, may simply be an area identification, such as a unique area ID within the network. When the network is required to be divided into layers, i.e., the areas are divided into different layers where a virtualization device of a lower layer also serves as a storage device in an upper layer, the area information may include an identification of the area which is managed by the virtualization device and an identification of the area where the virtualization device serves as a storage device. For example, a virtualization device belonging to two areas may have "layer ID+area ID" as the area information for each area.

The first apparatus may be another virtualization device, or a storage device, and the second apparatus may be another virtualization device, e.g., one in an upper layer area. It should be noted that the "first", "second", etc. are merely used for differentiating objects to facilitate the description, instead of indicating the objects are different in essence. A storage virtualization network may have pluralities of virtualization devices and pluralities of storage devices, and at least one of the virtualization devices and storage devices may adopt the apparatus provided by the examples.

The management module 203 may include one or more of the following units:

a judging unit 2031, configured for determining whether the first apparatus belongs to the first area based on a first message received from the first apparatus by the interface module 202 and the first area information in the storage module 201, therefore the apparatus may identify apparatuses within the local area (the first area), and establish connections with those apparatuses;

an information recording unit 2032, configured for storing information of the first apparatus into the storage module 201 when the judging unit 2031 determines the first apparatus belongs to the first area; therefore, the apparatus may record and maintain information of apparatuses within the area, and may determine whether an apparatus belongs to the area directly according to the recorded information when another message from the apparatus is received subsequently;

an information obtaining unit 2033, configured for receiving a third message sent by the first apparatus, and obtaining second storage resources information from the third message;

an information updating unit 2034, configured for store the second storage resources information provided by the information obtaining unit 2033 into the storage module 201 as part of the first storage resources information; therefore, the apparatus stores the storage resources information provided by the first apparatus via the third message into the storage module 201 for future use as data storage or as backup of other resources;

an information extracting unit 2035, configured for extract information of at least part of the first storage resources information in the storage module 201, and providing the information extracted to a message generating unit 2036;

the message generating unit 2036, configured for generating the second message based on information provided by the information extracting unit 2035, and sending the second message to the second apparatus via the interface module 202; therefore, the apparatus can provide storage resources information of the area managed by the apparatus for an apparatus in an upper layer area, where the information extracted may include information of only the available storage resources, or include information of all storage resources;

a connection management unit 2037, configured for sending a probe message periodically to the first apparatus, determining the first apparatus is unavailable when a response message is not received within a pre-set length of time, and start using a backup pre-set for the first apparatus; switching from the backup to the first apparatus when a response message is received; therefore, the apparatus may monitor a connection with another apparatus in real time, detect failure in connection timely and adopt measures to ensure the storage network to operate properly.

In an example, the information obtaining unit 2033 may further receive a fourth message from the first apparatus, inform the information updating unit 2034 to delete the second storage resources information; the information updating unit may generate a backup of data stored in the first apparatus, and send a second acknowledge message to the first apparatus after the backup is completed, and delete the second storage resources information in the storage module 201. Thus, the apparatus can add and delete storage devices dynamically, making it easy to adjust the network structure.

The structure described above may be physical structure, or logical structure composed of logical components classified by function. One or more of the modules, units may be implemented by individual devices respectively, or alternatively be implemented by the same component of a device. One module or unit may also be implemented by multiple devices or components, e.g., the storage module 201 may be implemented by multiple distributed storage entities residing in multiple devices or components. Connections between the modules or units may be logical connections, wired connections or wireless connections. In addition, all the modules and units shown in the drawings are not necessary, and may be omitted according to practical needs. In order to make the characteristics of the apparatus provided by the example more apparent, only parts involved in implementing the example are shown in the drawings, with other irrelevant parts, such as those for processing communication protocols, are omitted.

Figure 3A:
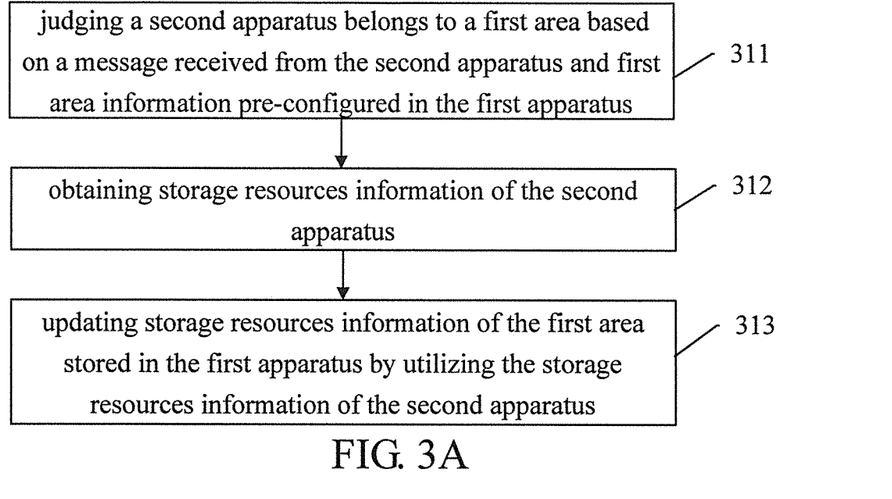
FIG. 3A is a flowchart illustrating a method for constructing a storage virtualization network according to an embodiment.

FIG. 3A is a flowchart illustrating a method for constructing a storage virtualization network according to an embodiment, which is executed by a first apparatus and mainly includes the following steps.

In step 311, the first apparatus judges a second apparatus belongs to a first area based on area information in a message sent by the second apparatus and first area information pre-configured in the first apparatus.

In step 312, the first apparatus obtains storage resources information of the second apparatus.

In step 313, the first apparatus updates storage resources first area information stored in the first apparatus by utilizing the storage resources information of the second apparatus.

Figure 3B:
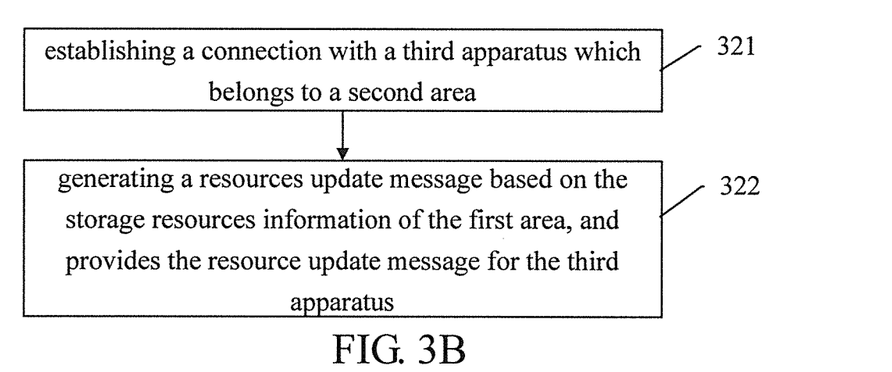
FIG. 3B is a flowchart illustrating a method for constructing a storage virtualization network according to an embodiment.

FIG. 3B is a flowchart illustrating a method for constructing a storage virtualization network according to an embodiment, which is executed by the first apparatus and mainly includes the following steps.

In step 321, the first apparatus establishes a connection with a third apparatus which belongs to a second area according to second area information pre-configured in the first apparatus.

In step 322, the first apparatus generates a resources update message based on the storage resources first area information, and provides the resources update message for the third apparatus.

An apparatus in the storage virtualization network may perform any one or two of the processing flows shown in FIG. 3A and FIG. 3B. The processing flows of FIGS. 3A and 3B may be executed by the same apparatus simultaneously or one after the other; may be carried out only once, or re-performed after a certain time period.

The above steps are not required to be executed in the above-specified order and some of them may be missed out. The order of the steps may be modified according to practical requirements. So it is with the steps described below.

The first apparatus may exchange information and judge whether the second apparatus belongs to the first area by following any one of the below methods.

1. The first apparatus may send a first probe message which includes the first area information, receive a first response message from the second apparatus, judge the second apparatus belongs to the first area based on area information in the first response message and the first area information, and may further send a first acknowledge message to the second apparatus.

2. The first apparatus may receive a first notify message sent by the second apparatus, judge the second apparatus belongs to the first area based on area information of the second apparatus in the first notify message and the first area information pre-configured in the first apparatus, and may further send a first acknowledge message to the second apparatus.

3. A fourth apparatus may be pre-configured as a proxy for forwarding messages. The first apparatus may send a third probe message which includes the first area information to the fourth apparatus according to a pre-configured address, receive a third response message, judge the second apparatus belongs to the first area based on information of the second apparatus in the third response message and the first area information, and may further send a third acknowledge message to the second apparatus.

The first apparatus may exchange information and provide storage resources first area information stored in the first apparatus for the third apparatus by following any one of the below methods.

1. The first apparatus may receive a second probe message from the third apparatus, judge the third apparatus belongs to the second area based on the second probe message and the second area information in the first apparatus, and provide the storage resources first area information to the third apparatus.

2. The first apparatus may send a second notify message which includes the second area information pre-configured in the first apparatus to the third apparatus, receive a second acknowledge message from the third apparatus, judge the third apparatus belongs to the second area based on area information in the second acknowledge message and the second area information pre-configured in the first apparatus, and provide the storage resources first area information for the third apparatus.

3. The first apparatus may send a second notify message which includes the second area information pre-configured in the first apparatus to the fourth apparatus, receive a fourth acknowledge message from the third apparatus, judge the third apparatus belongs to the second area based on area information in the second acknowledge message and the second area information pre-configured in the first apparatus, and provide the storage resources first area information for the third apparatus.

The above mentioned probe messages and notify messages may be broadcast messages or multicast messages whose destination address is set to be a multicast address pre-set in the apparatuses for the first area or the second area. Apparatuses belonging to the same area are configured with the same multicast address, and different areas have different multicast addresses. The multicast address may be pre-configured in the first apparatus, or may be generated by the first apparatus in a pre-defined manner. Alternatively, the area information may be generated based on the multicast address, or is the multicast address. For example, the multicast address may be obtained by adding a pre-defined prefix to an area identification.

The first apparatus may obtain the storage resources information of the second apparatus by accessing the second apparatus, or by receiving a first resources update message from the second apparatus and extracting the storage resources information of the second apparatus from the first resources update message.

The first apparatus may update the storage resources information of the first area by adding the storage resources information of the second apparatus to the storage resources information of the first area, or by incorporating the storage resources information of the second apparatus into the storage resources information of the first area utilizing other means. For example, a portion of the storage resources of the second apparatus may be allocated for use as backup resources, and the remainders of the storage resources of the second apparatus are recorded as available storage resources.

The second resource update message sent by the first apparatus to the third apparatus may include information of all or part of the storage resources of the first area, and may include information of one or more second apparatuses. For example, the first apparatus may provide the third apparatus with information of those resources recorded as available, or with information of all storage resources, and this depends on practical requirements or pre-defined policies.

When the first apparatus receives a quit message from the second apparatus, the first apparatus may start using a backup for the second apparatus, and delete the storage resources information of the second apparatus from the storage resources information of the first area. After that, the first apparatus may also send an acknowledge message indicating the second apparatus the quit process is finished.

The first apparatus may further send messages periodically to maintain the connection with the second apparatus. For example, the first apparatus may send the first probe message periodically, judge the second apparatus is currently unavailable when a first response message is not received from the second apparatus within a pre-set length of time, and start using a backup of the second apparatus; and switch from the backup to the second apparatus when receiving a first response message from the second apparatus.

Figure 4:
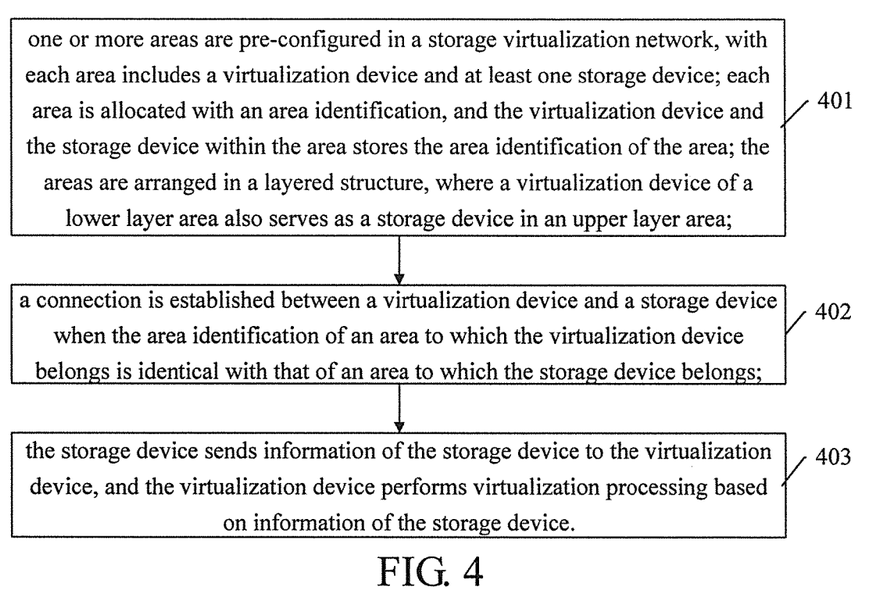
FIG. 4 is a flowchart illustrating a dynamic method for constructing a storage virtualization network according to an embodiment.

A dynamic maintenance method for storage virtualization network provided by an embodiment is described hereinafter. FIG. 4 is a flowchart illustrating a dynamic method for constructing a storage virtualization network according to an embodiment. The method may include steps as follows.

In step 401, one or more areas are pre-configured in a storage virtualization network, with each area includes a virtualization device and at least one storage device. Each area is allocated with an area identification, and the virtualization device and the storage device within the area stores the area identification of the area. The areas are arranged in a layered structure, where a virtualization device of a lower layer area also serves as a storage device in an upper layer area.

In step 402, a connection is established between a virtualization device and a storage device when the area identification of an area to which the virtualization device belongs is identical with that of an area to which the storage device belongs.

In step 403, the storage device having a connection established with the virtualization device sends information of the storage device to the virtualization device, and the virtualization device performs virtualization based on information of the storage device.

A physical virtualization device may simultaneous serve as a virtualization device (for storage devices abstracted by the virtualization device) and as a storage device (for another virtualization device which abstracts the virtualization device, i.e., a virtualization device of an upper layer area). With more resources are coordinated by the storage virtualization network, the layered structure not only satisfies requirements of layered management, but also has good extensibility.

Figure 5:
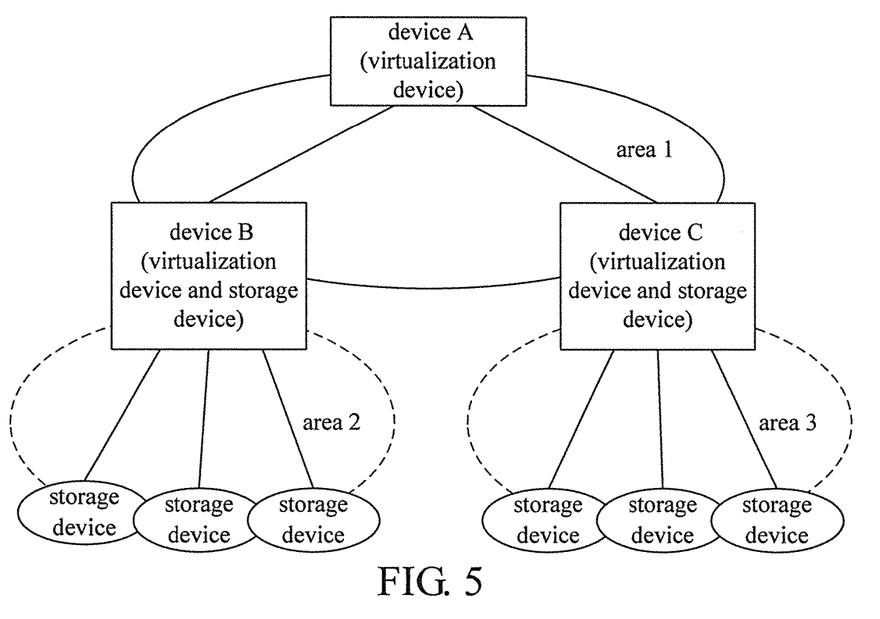
FIG. 5 is a schematic illustrating a structure of a storage virtualization network having areas and layers according to an embodiment.

FIG. 5 is a schematic illustrating a structure of a storage virtualization network having areas and layers according to an embodiment. The layers and areas configured in the storage virtualization network is applicable in both the in-band virtualization solution and the out-band virtualization solution, and FIG. 5 is merely an example of applying the structure to the in-band virtualization solution.

The layered area structure shown in FIG. 5 includes three areas belonging to two layers. Where, area 1 belongs to layer 1, the area 1 includes device A, device B and device C, among which device A is a virtualization device, device B and device C are storage devices;

area 2 and area 3 belong to layer 2; area 2 includes device B and multiple storage devices, and device B serves as a virtualization device of area 2; area 3 includes device C and multiple storage devices, and device C serves as a virtualization device of area 3.

It can be seen that, device B and device C are not only virtualization devices in respective lower layer areas, but also serve as storage devices in the upper layer area.

Each area has a unique area identification for differentiating different areas. The area identification is stored as a field in settings information of each device within the area. A message sent by a device may include the area identification, and connections are established only between devices which have the same area identification.

Figure 6:
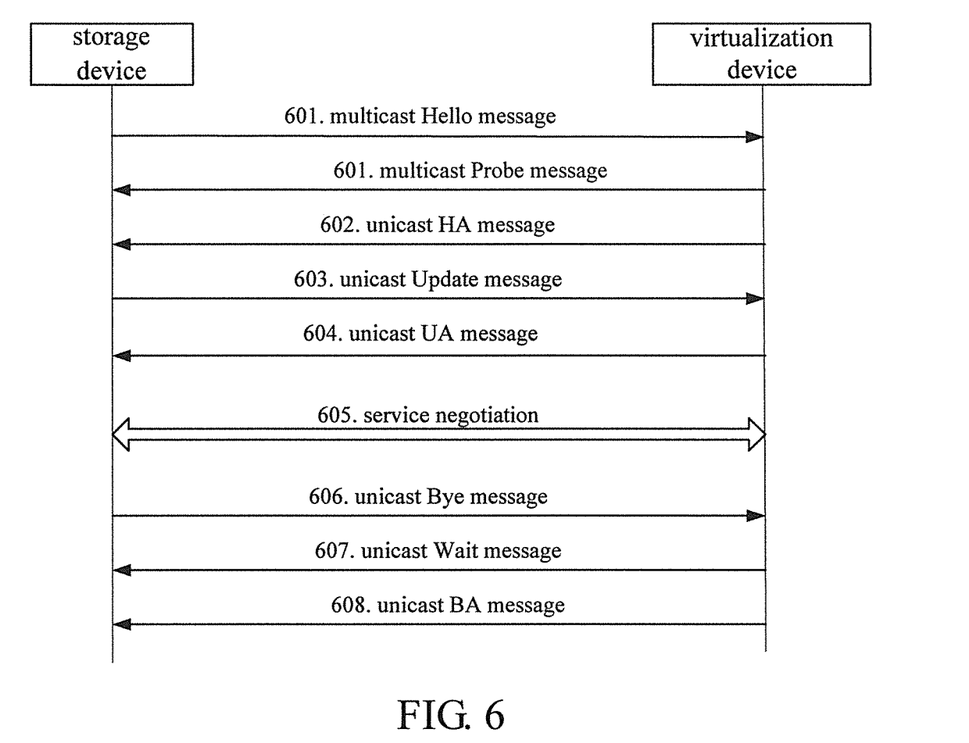
FIG. 6 is a flowchart illustrating a method for constructing a storage virtualization network according to an embodiment.

FIG. 6 is a flowchart illustrating a dynamic method for constructing a storage virtualization network according to an embodiment. The embodiment takes situations where the virtualization device and the storage devices are within the same IP network segment as an example. The embodiment only involves one virtualization device and one storage device in one area for being brief and clear. But those skilled in the art should understand the storage virtualization network may include pluralities of areas, and each area may include pluralities of such virtualization device and storage devices. The virtualization device and the storage device are relative concepts for the area described. In fact, the storage device may be an ordinary storage device or a virtualization device in a lower layer area.

Multiple areas are planed in a storage virtualization network, and the virtualization device and storage devices in each area are configured in advance. Then the following steps may be carried out.

In step 601, a storage device sends a multicast Hello message periodically. The multicast Hello message includes an area identification of the area where the storage device belongs, the IP address of the storage device and so on.

Meanwhile, a virtualization device may send a multicast Probe message periodically. The multicast Probe message includes an area identification of the area where the virtualization device belongs, and is for probing storage devices in the area.

When the storage device receives the multicast Probe message and finds that the area identification in the message is identical with the area identification of the area where the storage device belongs, the storage device may send a multicast Hello message in response to the Probe message.

The address of a multicast message sent by each device may be a unique multicast address pre-configured in the device, which may also be generated based on the area information by the device, e.g., based on the area identification, or based on a layer identification and the area identification, etc. In one embodiment, each device may be configured with one multicast address for each area where the device belongs. The multicast address may be used directly as the area information, or the area information may be obtained by extracting information from the multicast address configured.

In step 602, after receiving the multicast Hello message, the virtualization device sends a unicast Hell Acknowledge (HA) message to the storage device when it is determined that the area identification in the multicast Hello message is identical with the area identification of the area where the virtualization device belongs, and records information of the storage device in the virtualization device. When another multicast Hello message is received from the storage device after that, the virtualization device does not respond with a unicast HA message. When a unicast Update message is not received within a time period after the unicast HA message is sent, the virtualization device re-sends the unicast HA message.

In step 603, the storage device sends a unicast Update message to the virtualization device after receiving the unicast HA message.

The unicast Update message may include two type of content, one includes information of a new storage device, and the other includes information of a storage device to be deleted. Each type of content may include a type of storage resources, names of all Targets, storage resources in each Target, a type of storage resources array, and authentication information, such as CHAP/PAP authentication information, user name and password, and so on.

In this step, since the storage device is newly added, the unicast Update message includes the first type of content which includes information of the new storage device.

It should be noted that: 1) the storage device no longer has to send the multicast Hello message periodically after receiving the unicast HA message, and only needs to send a multicast Hello message in response to a multicast Probe message received; 2) when a multicast Hello message is not received from the storage device after multiple periods during each of which a multicast Probe message is sent, the virtualization device determines the storage device malfunctions, and sends an alert to an information center. In addition, the virtualization device may further judge whether there is a backup for the storage device, and start using the backup when there is the backup.

In step 604, the virtualization device sends an Update Acknowledge (UA) to the storage device after receiving the unicast Update message, and the UA message includes a name of an initiator, i.e., the virtualization device, and authentication information, such as CHAP/PAP authentication information.

It should be noted that the unicast Update message and the unicast UA message include authentication information, thus a management personnel no longer needs to do maintenance work for the large amount of authentication information at the device, and the virtualization device and the storage devices is able to be coordinated with each other automatically. So, the authentication scheme in existing storage virtualization solutions is no longer necessary when the dynamic maintenance method provided by the embodiment is adopted. In order to be safe, a unified area encryption information may be configured uniformly at each virtualization device and storage device. Thus, message contents of the unicast Update message and the unicast UA message may be encrypted, and the safety of the whole network can be guaranteed.

In step 605, the virtualization device may perform routine service negotiation after sending the UA message. For example, when the storage device is SAN, the virtualization device may establish a SAN (Storage Area Network) connection with the storage device; when the storage device is NAS, the virtualization device may establish a NAS (Network attached storage) connection with the storage device.

In step 606, when the storage device needs to quit (not because of malfunction, but in response to a planed operation of an administrator, e.g., the operation may include a click on a button on a interface, etc.), the storage device sends a unicast Bye message to the virtualization device.

In step 607, the virtualization device sends a unicast Wait message after receiving the unicast Bye message.

After sending the unicast Bye message, the storage device may re-send the unicast Bye message multiple times when the unicast Wait message is not received within a certain time period in case the unicast Bye message is lost.

In step 608, the virtualization device performs necessary processing according to pre-configured policy, such as making a backup of data in other storage space, etc. After the necessary processing is finished, the virtualization device sends a unicast Bye Acknowledge (BA) message to the storage device to confirm the quit of the storage device. The connection is also removed according to certain protocols.

Figure 7:
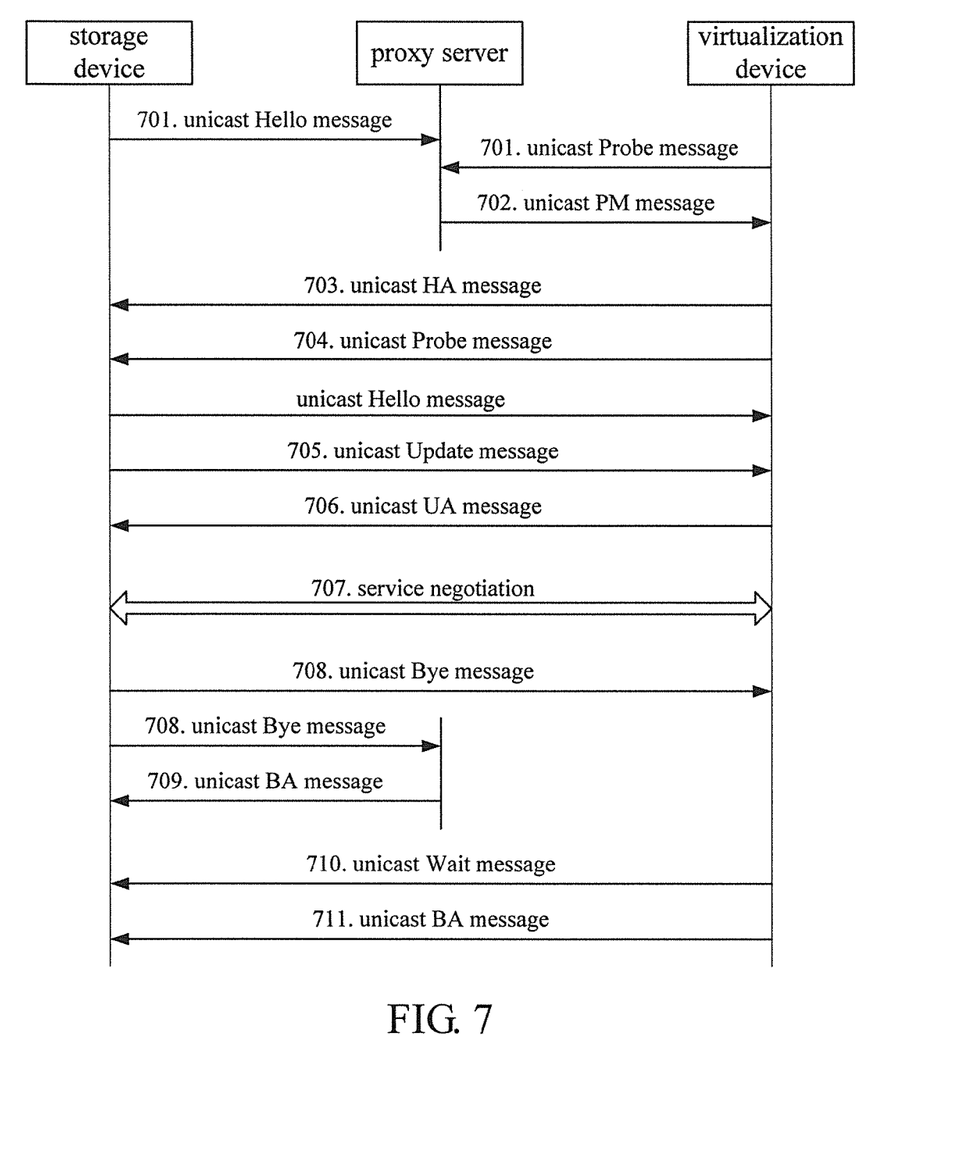
FIG. 7 is a flowchart illustrating a method for constructing a storage virtualization network according to an embodiment.

FIG. 7 is a flowchart illustrating a dynamic method for constructing a storage virtualization network according to an embodiment. The embodiment takes situations where the virtualization device and the storage devices are within different IP network segments as an example. In this situation, since a multicast message can not be forwarded into a different IP network segment due to its inability to pass through a router, a proxy server is needed to be set up in the network. The proxy server is configured to receive registrations from storage devices, receive queries from virtualization devices, and detect matching between virtualization devices and storage devices. The address of the proxy server is pre-configured in the virtualization devices and storage devices.

The embodiment only involves one virtualization device and one storage device in one area for being brief and clear. But those skilled in the art should understand the storage virtualization network may include pluralities of areas, and each area may include pluralities of such virtualization device and storage devices. The virtualization device and the storage device are relative concepts for the area described. In fact, the storage device may be an ordinary storage device or a virtualization device in a lower layer area.

Multiple areas are pre-configured in a storage virtualization network, and the virtualization device and storage devices in each area are configured in advance. Then the following steps may be carried out.

In step 701, a storage device sends a unicast Hello message periodically to a proxy server. The unicast Hello message includes an area identification of the area where the storage device belongs, the IP address of the storage device and so on.

Meanwhile, a virtualization device may send a unicast Probe message periodically to the proxy server. The unicast Probe message includes an area identification of the area where the virtualization device belongs, and is for probing storage devices in the area.

In this step, the unicast Hello message and the unicast Probe message is sent periodically throughout the whole process of the embodiment. For facilitating description, unicast Hello messages and unicast Probe messages sent subsequently are not shown in FIG. 7.

In step 702, after receiving the unicast Probe message, the proxy server detects a matching when judging the area identification in the unicast Probe message is identical with the area identification in the unicast Hello message sent by one or more storage devices which means the virtualization device sending the unicast Probe message is within the same area with the storage device sending the unicast Hello message. The proxy server sends a unicast Probe Match (PM) message to the virtualization device. The PM message may include IP address of all storage devices that matches with the virtualization device, and the area identification of the area where the virtualization device belongs, and so on.

In step 703, after receiving the PM message, the virtualization device sends a unicast HA message to each of the storage devices matched if the match is confirmed by the virtualization device, and records information of the storage devices in the virtualization device. When another unicast PM message including the IP address of the storage devices subsequently, the unicast HA message will not be sent to the storage devices. When a unicast Update message is not received within a certain time period after the unicast HA message is sent, the unicast HA message is re-transmitted.

In step 704, the virtualization device sends a unicast Probe message to the storage device periodically, and the storage device responds the virtualization device with a unicast Hello message. The two messages are sent for keeping information in the storage device and the virtualization device active.

When a unicast Hello message is not received from the storage device after multiple period during each of which a unicast Probe message is sent, the virtualization device determines the storage device malfunctions, and sends an alert to an information center.

In this step, the unicast Hello message and the unicast Probe message are sent periodically throughout the whole process, but for facilitating description, FIG. 7 only shows one transmitting cycle of the messages.

In step 703, the storage device sends a unicast Update message to the virtualization device after receiving the unicast HA message.

The unicast Update message may include two types of content, one includes information of a new storage device, and the other includes information of a storage device to be deleted. Each type of content may include a type of storage resources, names of all Targets, storage resources in each Target, a type of storage resources array, and authentication information, such as CHAP/PAP authentication information, user name and password, and so on.

In this step, since the storage device is newly added, the unicast Update message includes the first type of content which includes information of the new storage device.

In step 706, the virtualization device sends an Update Acknowledge (UA) to the storage device after receiving the unicast Update message, and the UA message includes a name of an initiator, i.e., the virtualization device, and authentication information, such as CHAP/PAP authentication information.

In step 707, the virtualization device may perform routine processing such as service negotiation after sending the UA message. For example, when the storage device is SAN, the virtualization device may establish a SAN connection with the storage device; when the storage device is NAS, the virtualization device may establish a NAS connection with the storage device.

In step 708, when the storage device needs to quit, the storage device sends a unicast Bye message to each of the proxy server and the virtualization device.

In step 709, after receiving the unicast Bye message, the proxy server returns a unicast BA message to the storage device.

After sending the unicast Bye message, the storage device may re-send the unicast Bye message multiple times when the unicast BA message is not received within a certain time period in case the unicast Bye message is lost.

In step 710, the virtualization device sends a unicast Wait message after receiving the unicast Bye message.

After sending the unicast Bye message, the storage device may re-send the unicast Bye message multiple times when the unicast Wait message is not received within a certain time period in case the unicast Bye message is lost.

In step 711, the virtualization device performs necessary processing according to pre-configured policy, such as making a backup of data in other storage space, etc. After the necessary processing is finished, the virtualization device sends a unicast Bye Acknowledge (BA) message to the storage device to confirm the quit of the storage device. The connection is also removed according to certain protocols.

Step 709 and steps 710 to 711 are respectively performed by the proxy server and the virtualization device, and there is no fixed order of performing the steps.

The above two embodiments are described taking information exchanging in one of the areas as an example. As stated above, the storage virtualization network has a layered structure. When a virtualization device of a lower layer area also serves as a storage device in an upper layer area, the unicast Update message sent device may include not only information of the device, but also information of devices in the lower layer area. Thus, more information is exchanged between the virtualization device and the storage device, which makes the virtualization more powerful and the storage space fully used.

For example, when the virtualization device also serves as a storage device providing software RAID (Redundant Array of Inexpensive Disc) functions such as volume mirror, etc. for another virtualization device, the Update message sent by the virtualization device may provide not only information such as names of all targets, storage resources of each target, type of storage resources array, etc. which are through the software RAID processing, but also original information provided by storage devices in the lower layer area such as original names of all targets, storage resources of each target, type of storage resources array, etc. Therefore, a virtualization device in a highest layer area may consider requirements of an initiator to choose to use the array after the soft RAID processing or the original array functions, and thus the storage space can be fully used.

The process is carried out during service negotiation. Taking the network in FIG. 5 as an example, a storage device provides the virtualization device B with the following resources: target being Tg 1, resources being Lv 1, array type being raid 0; another storage device provides the virtualization device B with the following resources: target being Tg 2, resources being Lv 2, array type being raid 0. The virtualization device B performs soft RAID processing on the resources of the two storage devices to provide volume mirror.

The virtualization device B reports the information to virtualization device A via a unicast Update message, then virtualization devices A and B may negotiate to divide the resources into three parts: resource 1 which is one half of the resources after volume mirror processing and equivalent to RAID 01; resource 2 which is the remaining space in lv 1; resource 3 which is the remaining space in lv2.

In operation, the resources may be allocated to each initiator after the storage devices are coordinated automatically; or an administrator may pre-configure a resource allocation scheme according to the need of each initiator, and resources are allocated automatically according to storage resources information obtained. The former method is suitable for deployment within a network of an enterprise and can make the resources fully utilized. The latter method is suitable for resource deposit service, can pre-configure requirements according to the needs of a user, and the virtualization device can be allocated with certain storage space from resources actually obtained according to a certain policy.

It can be seen that the dynamic method for constructing storage virtualization provided by embodiments is able to dynamically group devices in a storage virtualization network to make the devices easy to be managed and maintained; able to provide a general and extensible basic interacting manner for interaction between virtualization devices and storage devices, so that various requirements of practical management can be satisfied, and various existing virtualization functions can also be inherited. The embodiments provide an inter-device signaling scheme which can bear instructions for implementing virtualization and is independent from contents of the virtualization functions, thus the signaling scheme is easy to be transplanted to other application scenarios.

One embodiment also provides a dynamic maintenance system for storage virtualization. The system includes one or more areas, and each area includes a virtualization device and more than one storage devices. Each area is allocated with an area identification, and the virtualization device and the storage devices within the area store the area identification of the area. The areas are arranged in a layered structure, where a virtualization device of a lower layer area also serves as a storage device in an upper layer area.

The storage device is configured for establishing a connection with a virtualization device when an area identification of the area where the virtualization device is identical with that of the area where the storage device belongs, and sending information of the storage device to the virtualization device;

the virtualization device is configured for establish a connection with the storage device when the area identification of the area where the virtualization device is identical with that of the area where the storage device belongs, and perform virtualization processing based on information of the storage device.

In the system, the storage device may further remove the connection with the virtualization device when the storage device needs to quit.

In the system, the virtualization device may further remove the connection with the virtualization device when the storage device needs to quit.

In the system, the storage device may send a multicast Hello message to the virtualization device when the virtualization device and the storage device reside in the same IP network segment. The multicast Hello message may include the area identification of the area where the storage device belongs and an IP address of the storage device.

When the virtualization device and the storage device reside in the same IP network segment, the virtualization device may send a unicast HA message to the storage device when determining the area identification of the area where the virtualization device belongs is identical with that of the area where the storage device belongs, and establish a connection between the virtualization device with the storage device.

Alternatively, the system may include a proxy server.

The storage device may send a unicast Hello message to the proxy device when the virtualization device and the storage device reside in different IP network segments. The unicast Hello message may include the area identification of the area where the storage device belongs and an IP address of the storage device.

When the virtualization device and the storage device reside in different IP network segments, the virtualization device may send a unicast Probe message to the proxy server, and send a unicast HA message to the storage device when receiving a unicast PM message from the proxy server and establish a connection with the storage device. The unicast Probe message may include the area identification of the area where the virtualization device belongs.

The proxy server may send a unicast PM message when determining the area identification of the area where the virtualization device belongs is identical with that of the area where the storage device belongs. The unicast PM message may include the IP address of the storage device which matches with the virtualization device, and the area identification of the area where the virtualization device belongs.

In the above system, information of the storage device sent by the storage device may include: a type of storage resources, names of all targets, storage resources of each target, a type of storage resource array, and authentication information.

The information of the storage device sent by the storage device to the virtualization device may include:

information of the storage device and information of storage devices in a lower layer area when the storage device also serves as a virtualization device in the lower layer area.

The embodiments may be implemented by hardware, software or a combination of hardware and software, or a processor and a memory storing machine readable instructions executable by the processor.

The memory used in embodiments may store machine readable instructions which cause the processor to function as a management module within a storage device or a virtualization device of a storage virtualization network.

Software used in embodiments may be stored in storage medium readable by multiple processors, such as hard drive, CD-ROM, DVD, compact disk, floppy disk, magnetic tape drive, RAM, ROM or other proper storage device. Or, at least part of the software may be substituted by specific-purpose hardware, such as custom integrated circuits, gate array, FPGA, PLD and specific-purpose computers and so on.

The invention claimed is:

1. An apparatus of a storage virtualization network, the apparatus comprising:
a hardware processor to execute computer readable instructions, wherein the storage virtualization network comprises a plurality of areas divided into different layers, wherein the hardware processor implements a first virtualization device of an upper layer of the different layers to manage a first area, of the plurality of areas, in the upper layer; and
a storage device to store area information for the first area, the area information including area information and layer information of the first area, and to store first storage resources information identifying storage resources of the first area,
wherein the hardware processor is to:
implement an interface with a first apparatus, wherein the first apparatus is a second virtualization device of a lower layer of the different layers, the lower layer comprising an area different than the first area in the upper layer, and wherein the first apparatus is a storage device in the upper layer of the different layers;
determine whether the first apparatus belongs to the first area based on area information in a first message sent by the first apparatus and the first area information stored in the storage module, and
in response to a determination that the first apparatus belongs to the first area, receive second storage resources information from the first apparatus identifying storage resources of the first apparatus, and update the first storage resources information stored in the storage device to include the second storage resources information.

2. The apparatus of claim 1, wherein:
the storage device is further to store second area information;
the hardware processor is further to generate a second message based on the first storage resources information in the storage device, and to send the second message to a second apparatus according to the second area information; and
a destination address of the first message and the second message is set to a multi-cast address.

3. The apparatus of claim 2, wherein the hardware processor is further to:
extract information of at least part of the first storage resources information in the storage device, and generate the second message based on the extracted information and the second area information in the storage device; and
send the second message to the second apparatus.

4. The apparatus of claim 3, wherein the hardware processor is further to:
send a probe message periodically;
determine that the first apparatus is currently unavailable in response to a response message not being received from the first apparatus within a pre-set length of time;
in response to a determination that the first apparatus is currently unavailable, start using a backup of the first apparatus; and
switch from the backup to the first apparatus when receiving a response message from the first apparatus.

5. The apparatus of claim 1, wherein the hardware processor is to send a first acknowledge message to the first apparatus.

6. The apparatus of claim 5, wherein the hardware processor is further to:
receive a third message sent by the first apparatus, and to obtain the second storage resources information from the third message.

7. The apparatus of claim 6, wherein the hardware processor is further to:
store the second storage resources information and information of the first apparatus into the storage device as part of the first storage resources information.

8. The apparatus of claim 1, wherein the hardware processor is to receive a subsequent message from the first apparatus to instruct the hardware processor to:
make a backup for data stored in the first apparatus;
send a second acknowledge message to the first apparatus after the backup is made; and
delete the second storage resources information from the storage device.

9. The apparatus of claim 1, wherein the first area information, including the area information and the layer information of the first area, includes a layer ID and an area ID of the first area.

10. A method for managing a storage virtualization network, the method comprising:

in a storage virtualization network divided into different layers, wherein the storage virtualization network comprises a plurality of areas divided into the different areas, determining, by a processor of a first apparatus, that a second apparatus belongs to a first area of the plurality of areas based on area information in a message sent by the second apparatus and first area information in the first apparatus,
   wherein the first area information includes area information and layer information of the first area,
   wherein the first apparatus is a virtualization device to manage the first area, the first area comprising an upper layer of the different layers, and
   wherein the second apparatus is a second virtualization device of a lower layer of the different layers, the lower layer comprising an area different than the first area in the upper layer, and is a storage device in the upper layer of the different layers;

obtaining, by the first apparatus, storage resources information of the second apparatus; and updating, by the first apparatus, storage resources information of the first area stored in the first apparatus by utilizing the storage resources information of the second apparatus.

11. The method of claim 10, further comprising:
establishing, by the first apparatus, a connection with a third apparatus belonging to a second area according to second area information pre-configured in the first apparatus, generating a resources update message based on storage resources first area information, and providing the resources update message for the third apparatus.

12. The method of claim 11, wherein the resources update message comprises information of at least part of storage resources in the first area.

13. The method of claim 11, wherein establishing by the first apparatus a connection with a third apparatus which belongs to a second area and providing the resources update message for the third apparatus comprises:
   receiving, by the first apparatus, a second probe message from the third apparatus, determining the third apparatus belongs to the second area based on the second probe message and the second area information in the first apparatus, and providing the resources update message for the third apparatus;
   sending, by the first apparatus, a second notify message which includes the second area information pre-configured in the first apparatus to the third apparatus, receiving a second acknowledge message from the third apparatus, determining the third apparatus belongs to the second area based on area information in the second acknowledge message and the second area information pre-configured in the first apparatus, and providing the resources update message for the third apparatus; and
   sending, by the first apparatus, a second notify message which includes the second area information pre-configured in the first apparatus to a fourth apparatus, receive a fourth acknowledge message from the third apparatus, judge the third apparatus belongs to the second area based on area information in the second acknowledgement and the second area information pre-configured in the first apparatus, and providing the resources update message for the third apparatus.

14. The method of claim 10, further comprising:
receiving, by the first apparatus, a quit message from the second apparatus, starting using a backup for the second apparatus, and deleting the storage resources information of the second apparatus from the storage resources information of the first area.

15. The method of claim 10, further comprising:
sending, by the first apparatus, a probe message periodically;
determining the second apparatus is currently unavailable in response to not receiving a response message from the second apparatus within a pre-set length of time, and starting using a backup of the second apparatus; and
switching from the backup to the second apparatus when receiving a response message from the second apparatus.

16. The method of claim 10, wherein determining by the first apparatus that a second apparatus belongs to a first area comprises at least one of:
   sending, by the first apparatus, a first probe message which includes the first area information, receiving a first response message from the second apparatus, and determining the second apparatus belongs to the first area based on area information in the first response message and the first area information;
   receiving, by the first apparatus, a first notify message sent by the second apparatus, and determining the second apparatus belongs to the first area based on area information of the second apparatus in the first notify message and the first area information pre-configured in the first apparatus; and
   sending, by the first apparatus, a third probe message which includes the first area information to a fourth apparatus according to a pre-configured address, receiving a third response message, determining the second apparatus belongs to the first area based on information of the second apparatus in the third response message and the first area information, and sending an acknowledge message to the second apparatus.

17. The method of claim 10, wherein the first area information, including the area information and the layer information of the first area, includes a layer ID and an area ID of the first area.

18. A non-transitory computer readable medium comprising instructions, that when executed by a processor of a first apparatus, cause the first apparatus to:
manage a storage virtualization network divided into different layers, wherein the storage virtualization network comprises a plurality of areas divided into the different areas, wherein the instructions cause the first apparatus to:
   determine that a second apparatus belongs to a first area of the plurality of areas based on area information in a message sent by the second apparatus and first area information in the first apparatus,
      wherein the first area information includes area information and layer information of the first area,
      wherein the first apparatus is a virtualization device to manage the first area, the first area comprising an upper layer of the different layers, and
      wherein the second apparatus is a second virtualization device of a lower layer of the different layers, the lower layer comprising an area different than the first area in the upper layer, and is a storage device in the upper layer of the different layers;

obtain storage resources information of the second apparatus; and update storage resources information of the first area stored in the first apparatus by utilizing the storage resources information of the second apparatus.

19. The non-transitory computer readable medium of claim 18, wherein the instructions are to further cause the first apparatus to:

establish a connection with a third apparatus belonging to a second area according to second area information pre-configured in the first apparatus;

generate a resources update message based on storage resources first area information; and provide the resources update message for the third apparatus.

20. The non-transitory computer readable medium of claim 18, wherein the first area information, including the area information and the layer information of the first area, includes a layer ID and an area ID of the first area.

* * * * *